United States Patent Office 3,360,931
Patented Jan. 2, 1968

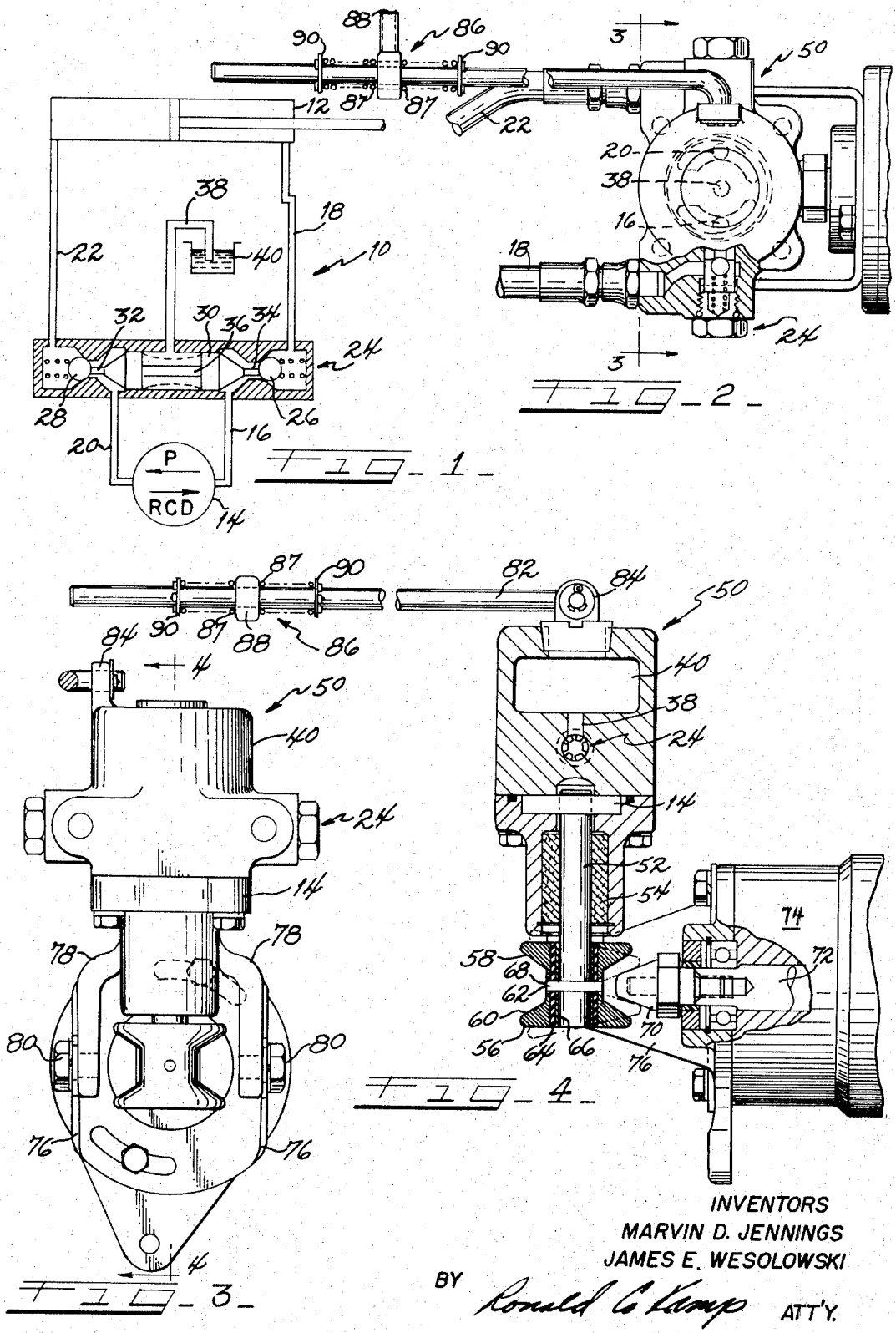

3,360,931
HYDRAULIC SYSTEM
Marvin D. Jennings, Naperville, and James E. Wesolowski, Lemont, Ill., assignors to International Harvester Company, Chicago, Ill., a corporation of New Jersey
Filed Mar. 22, 1966, Ser. No. 536,346
4 Claims. (Cl. 60—52)

The present invention relates generally to hydraulic systems for controlling the hydraulic motor, and more particularly, to such circuits which utilize a reversible pump to determine the direction of movement of the hydraulic motor.

It is an object of the present invention to provide a hydraulic system for controlling a bi-directional or reversible hydraulic motor which is simple, compact and inexpensive.

It is also an object of this invention to provide a hydraulic system for controlling a double-acting hydraulic motor which requires a power input only when it is desired to change the attitude of the hydraulic motor, which does not accumulate or appreciably increase the heat in the hydraulic fluid within the system, which does not require a large reservoir of fluid, and which is highly efficient.

It is still another object of this invention to provide a hydraulic system for control of a double-acting hydraulic motor which does not rely upon the use of expensive valves to control the direction flow within the system.

These and other objects and many of the intended advantages will become more readily apparent from the perusal of the following description and the accompanying drawings, wherein:

FIGURE 1 is a schematic view of the hydraulic circuit utilized by the present invention;

FIGURE 2 is a top plan view, with portions broken away, of a preferred embodiment of the invention, but omitting the hydraulic motor;

FIGURE 3 is a vertical elevation taken on line 3—3 of FIGURE 2; and

FIGURE 4 is a cross-sectional view taken on line 4—4 of FIGURE 3.

Referring now to the schematic diagram of FIGURE 1, there is shown a typical hydraulic circuit, indicated generally at 10, which may be utilized with the hydraulic system of the present invention and includes a double-acting hydraulic motor or ram 12 and a reversible constant delivery pump 14. One end of the hydraulic motor 12 is connected to the pump 14 through conduits 16 and 18 while the other end of the motor 12 is connected to the pump 14 through conduits 20 and 22. In the illustrated embodiment of FIGURE 1, the hydraulic motor 12 is of the differential type, i.e. the volume displaced on the piston side of the cylinder is greater than the volume displaced on the rod side and thus a valve unit 24 is interposed between the conduits 16 and 18 and the conduits 20 and 22. The valve unit 24 includes a pair of spring seated check valves 26 and 28 which block or seal off hydraulic communication between conduits 16 and 18, and 20 and 22 respectively. A shuttle valve 30 having a pair of projections 32 and 34 is positioned within the valve unit 24 between the check valves 26 and 28. The shuttle valve 30 is provided with a plurality of grooves 36 around the periphery thereof which are in communication with a conduit 38 extending to a reservoir 40. Rotation of the pump 14 in a direction to produce hydraulic fluid under pressure in conduit 16 will unseat the check valve 26 directing fluid under pressure to conduit 18, while simultaneously shifting the shuttle valve 30 to the left as viewed in FIGURE 1 causing the projection 32 to unseat the check valve 28. Communication is thereby provided between conduits 20 and 22 to permit flow of hydraulic fluid from the motor to the intake side of the pump 14. With the shuttle valve 30 shifted to the left, hydraulic communication is also provided between the reservoir 40 and the conduits 22 and 20 through the conduit 38 and the grooves 36, thereby permitting the fluid in excess of pump capacity to be dumped to the reservoir 40. When the pump 14 is rotated in the opposite direction providing hydraulic fluid under pressure in conduit 20, the check valve 28 will be unseated providing communication between conduits 20 and 22 and shifting the shuttle valve 30 to the right, as viewed in FIGURE 1. With the shuttle valve 30 so positioned, the check valve 26 is unseated and the grooves 36 connect the reservoir 40 with the conduits 16 and 18, thereby permitting make-up fluid to be extracted from the reservoir. If the hydraulic motor 12 is of a constant displacement type a closed system could be utilized eliminating the reservoir 40 the conduit 38 and the shuttle valve 30. In such a case, the check valves 26 and 28 would be of the pilot operated type arranged so that both check valves would be opened whenever pressure appears in either of the conduits 16 and 20.

The physical structure of the preferred embodiment of this invention is illustrated in FIGURES 2 through 4 wherein the pump 14, conduits 20 and 16, the valve unit 24, conduit 38, and the reservoir 40 are incorporated into a unitary structure referred to generally as pump unit 50. The pump 14, which as shown is of the gear-within-gear type but which may be any of the reversible constant delivery type pumps, has a shaft 52 which is rotatably mounted within the housing of the pump unit 50 by means of a sleeve bearing 54. A driven member of sheave 56 having upper and lower conical surfaces 58 and 60 respectively is secured to the free end of the shaft 52 by means of a pin 62. A rubber sleeve 64 is inserted between the sheave 56 and the shaft 52, and a metal bushing 66 is inserted between the sleeve 64 and the shaft 52. The holes 68 provided in the sheave 56 to receive the pin 62 are slightly larger than the diameter of the pin 62, while the holes provided in both the sleeve 64 and the bushing 66 are approximately the same diameter as the pin. This arrangement permits slight misalignments between the sheave and the shaft and, in addition, permits the rubber sleeve to absorb vibrations which would normally be transmitted to the shaft 52. A conical drive member 70 is secured to a source of rotating power, such as, for example, the rotating shaft 72 of a generator 74 and extends outwardly toward the pump unit 50. A pair of arms 78 formed on the body of the pump unit 50 are positioned on either side of the sheave 56 and are pivotally secured to the bifurcated brackets 76 by means of two bolts 80. The bolts 80 are axially aligned and define an axis about which the pump unit 50 may be pivoted. A control lever 82 is pivotally secured to an ear 84 formed on the top of the pump unit 50. Pushing on the control lever 82 will result in clockwise rotation of the pump unit 50 about the pivot axis defined by the bolts 80 to bring the upper conical surface of the sheave 56 into contact with the upper surface of the drive cone 70, and a tension force applied to the control rod 82 will pivot the pump unit 50 so that the lower control surface 60 of the sheave 56 comes into contact with the drive cone 70. Since the drive cone 70 rotates constantly in one direction and frictional engagement between the upper conical surface and the drive cone will result in the rotation of the pump in one direction while frictional engagement between the lower conical surface 60 and the drive cone will result in the rotation of the pump 14 in the opposite direction. A self-centering device indicated generally at 86 is provided on the control lever 82 and consists essentially of a pair of compression springs 87 positioned over the control lever 82 on either side of a fixed reaction member 88 and a pair of washers 90 secured to the control lever 82. The centering device 86 returns the pump unit 50 to neutral position, i.e. that position wherein neither of the conical surfaces 58 and 60 are in frictional engagement with the drive cone 70.

It has been found that the maximum life can be obtained for the disclosed drive system when the drive cone 70 is made from a ceramic material and the sheave 56 is made from steel. Tests have shown that a ceramic material identified as W-1542 96 percent alumina ceramic provides optimum wear characteristics when frictionally engaging a driven member made of mild alloy steel. Wear of the engageable drive members is of extreme importance especially when, as previously suggested, the driving force is provided by the generator of a small garden tractor, such generators often running at speeds of about 10,000 r.p.m.

It can be appreciated from the foregoing description that the present invention provides a simple, compact and inexpensive means for controlling a hydraulic circuit utilizing a reversible constant delivery pump to actuate a hydraulic motor. Control of the hydraulic circuit is easily achieved by the present invention by the expediate of simply pivoting the pump unit itself to determine the direction of rotation of the pump 14 and hence the direction of flow of hydraulic fluid within the circuit. In addition to the advantages of the simple control means, the present invention is highly efficient in that no pumping is done when the pump unit 50 is in neutral position, thereby avoiding frictional losses incurred by circulating the hydraulic fluid needlessly, and thus, eliminating the need for a large reservoir to maintain the temperature of the hydraulic fluid at a low level. When such a system is utilized on a small garden tractor or other vehicle having a low horsepower, the freedom from turning the pump during the starting operation is especially advantageous, particularly when the weather is cold and the viscosity of the hydraulic fluid is high.

While we have illustrated and described a preferred embodiment of our invention, it is to be understood that this is capable of variation and modification, and we therefore do not wish to be limited to the precise details set forth, but desire to avail ourselves of such changes and alterations as fall within the purview of the following claims:

What is claimed is:

1. In a hydraulic system having a double-acting motor, a reversible pump having a rotatable shaft, a unidirectional source of rotary power, and conduit means providing hydraulic communication between said pump and motor, the improvement comprising:

a drive cone connected to one of said source and shaft,
   a pair of driven cones connected to the other of said source and shaft,
   mounting means pivotally supporting said pump to position said drive cones adjacent to and on either side of said drive cone,
   lever means affixed to said pump for pivoting the same into first and second position from a center neutral position wherein said drive cone is spaced from said driven cones,
   said pump in said first position forcing one of said driven cones into frictioned engagement with said drive cone and in said second position forcing the other of said driven cones into frictional engagement with said drive cone.

2. In a hydraulic system according to claim 1 and further comprising:
   check valve means in said conduit means for locking said motor whenever said pump is in neutral position.

3. In a hydraulic system according to claim 1 and further comprising:
   bias means for urging said pump into neutral position.

4. In a hydraulic system according to claim 1 wherein one of said drive cone and said driven cones is made of ceramic material and the other of said cones is made of steel.

No references cited.

EDGAR W. GEOGHEGAN, *Primary Examiner.*